Sept. 6, 1960 J. C. WARD 2,951,709
SUSPENSIONS FOR TANDEM AXLES
Filed July 2, 1956 5 Sheets-Sheet 2

Inventor
James C. Ward
By Wallace and Cannon
Attorneys

Sept. 6, 1960  J. C. WARD  2,951,709
SUSPENSIONS FOR TANDEM AXLES
Filed July 2, 1956  5 Sheets-Sheet 3

Inventor
James C. Ward
By Wallace and Cannon
Attorneys

United States Patent Office 2,951,709
Patented Sept. 6, 1960

2,951,709

SUSPENSIONS FOR TANDEM AXLES

James C. Ward, Springfield, Mo., assignor, by mesne assignments, to Alaska Juneau Gold Mining Company, Los Angeles, Calif., a corporation of West Virginia Filed July 2, 1956, Ser. No. 595,388

24 Claims. (Cl. 280—104.5)

This invention relates to spring suspensions such as are employed in association with the rear wheels of vehicles that are subjected to heavy duty service such as large trucks and vans and the trailers that are used in association with cab type tractors. In such vehicles it is advantageous to distribute the load that is to be borne by the rear wheels between sets of wheels that are mounted on spaced apart and parallel axles.

Vehicle suspensions of the kind to which this invention relates, and which are usually known as tandem spring suspensions, have usually included a bearing arrangement about which the support for the spaced apart axles may pivot in the course of movement of the vehicle especially over rough surfaces and the like and such pivotal action is intended to be effective to uniformly distribute the forces effective upon the wheels carried by the respective axles of the tandem spring suspension and thereby maintain the frame of the vehicle in at least substantially level condition. Particularly because of the relatively severe service to which arrangements of the aforesaid character are subjected, it has been observed that the bearing arrangement about which the aforesaid pivotal action occurs tends to wear quite rapidly which necessitates frequent adjustment and repair or replacement of the bearing arrangements. In an endeavor to overcome such difficulties it has been proposed heretofore to resort to rubber or like elements to accommodate the torsional strains set up in the aforesaid pivotal action and while such rubber or like elements function far more satisfactorily than, for example, metal bearing arrangements, it has not been possible to resort to rubber or like elements in many instances because of the limited capacity of such elements to accommodate the torsional strains to which the same are subjected in many instances.

Hence, it is an important object of this invention to enable pivotal or rocking movement to be effected in a spring suspension of the aforesaid character and thereby promote uniform distribution of the stresses and strains between the two axles of such a suspension and the wheels respectively carried by such axles, and thereby insure relatively level movement of the vehicle of which the suspension is a part, by resorting to a resilient means as the supporting element which affords a fulcrum about which the pivotal action may occur. Related objects are to resort to a resilient pad or the like to afford the aforesaid fulcrum; to so arrange such means or pad that the same will be subjected to compressive rather than torsional stresses and strains; and to afford resilient means of the aforesaid nature that are so constituted and arranged that the compressive forces exerted thereon may be properly and adequately accommodated thereby.

A more specific object of this invention is to so arrange an operative element of a tandem spring suspension of the aforesaid character that the same may act as a beam that pivots about a fulcrum without setting up objectionable rubbing or other wear inducing actions in the course of rocking movement of the beam that promotes uniform distribution of the encountered stresses on the respective axles of the tandem and a related object is to afford a pad of resilient material, such as rubber, and about which the aforesaid fulcruming action may so occur in such a way as to impress compressive forces on such pad as an incentive to the fulcruming action.

Tandem spring suspensions of the kind to which this invention relates are usually so arranged that a wheel or the wheels associated with one axle of the pair thereof in the tandem suspension may ride over a bump or pass into a depression while a wheel or the wheels associated with the other axle of the pair remains or remain on a relatively level surface or may be either passing over a bump or through a depression unrelated to that encountered by the wheel or wheels carried by the first named axle and yet permit relative movement of the vehicle of which the suspension is a part. In order that this may be realized, a leaf spring arrangement is disposed in suspensions of the aforesaid character in such a way as to have the opposite ends thereof respectively associated with the spaced axles. Frequently in arrangements of this kind resort is had to two leaf springs disposed in alignment one with the other and adjacent ends of such spring have been associated with a pivotally mounted member, commonly called an equalizer, and the remote ends of such springs have been respectively associated with corresponding ends of the spaced apart axles. The aforesaid movement of a wheel or the wheels associated with one axle of a tandem spring suspension induces the pivotal movement that has been referred to hereinabove and it is the leaf spring arrangement of the aforesaid character that so pivots as to effect the desired uniform distribution of stresses between the two axles and permit relatively level travel of the vehicle. In tandem spring arrangements as these have been constructed heretofore, it has been the pivotal movement of the spring arrangement occasioned as aforesaid that has induced the objectionable wear hereinabove referred to, such wear having been occasioned at the support afforded for the medial part of the spring arrangement and it is, therefore, still another object of this invention to resort to a single spring arrangement extended between corresponding ends of the spaced apart axles in a tandem of the aforesaid character and to so support the medial portion of such a spring arrangement as to enable the hereinabove referred to pivotal movement to be effected without inducing objectionable wear. Related objects are to so arrange the interconnection between the respective axles and the spring ends as to enable relative movement to be effected therebetween without inducing objectionable wear of the engaged elements; to so arrange such interengaging portions of the spring and axles as to reduce incidental friction to a minimum; and to restrict such relative movement under some conditions of operation and permit comparatively substantial relative movement to occur under other operative conditions.

Inasmuch as the vehicles with which tandem spring suspensions of the kind to which this invention relates are used may often be quite heavily loaded, it is necessary to include in the suspension a spring arrangement of sufficient capacity to resiliently bear the heaviest load that is to be borne by the vehicle and resultantly relatively strong spring arrangements are employed. Because of this, when the vehicle is empty or lightly loaded, the effect of such a spring arrangement is such that very little resiliency is afforded thereby and consequently the vehicle tends to objectionably bounce and otherwise improperly perform in the course of movement thereof under empty or lightly loaded conditions which sets up objectionable relatively high frequency vibrations under such conditions.

It is, therefore, another object of this invention to include in a suspension of the aforesaid nature a spring arrangement of sufficient capacity to adequately and properly accommodate the load to be borne by the vehicle of which the suspension is a part and yet afford an arrangement of such nature that the vehicle will function under empty or lightly loaded conditions. A related object is to afford a resilient arrangement in a spring suspension of the aforesaid character which will be effective to properly accommodate empty or lightly loaded conditions in the vehicle of which the suspension is a part and to associate therewith an additional resilient suspension which will be effective when the vehicle is loaded to an extreme greater than that which can be accommodated by the resilient suspension that is effective under empty or lightly loaded conditions of the vehicle.

A more specific object is to utilize a resilient pad of resilient material, such as rubber, as the resilient load bearing portion of the suspension, when the vehicle of which the suspension is a part is empty or lightly loaded, and to afford another and stronger metallic resilient load bearing arrangement, which may be a suitable leaf spring arrangement and which will be effective when the vehicle is loaded to an extent greater than that which can be properly accommodated by the resilient pad. A still further object is to so interrelate load bearing portions of the aforesaid character as to insure proper cooperation therebetween and proper operation thereof in the course of movement of the vehicle of which the suspension in which such load bearing portions are provided is a part.

Yet another object of this invention is to so arrange a suspension of the aforesaid character that the same may be supplied as a unit, ready for attachment to a vehicle, by resorting to a center support or attaching arrangement that is adapted to be the connection to the frame of the vehicle of which the suspension is to be a part, and an object ancillary to this is to so arrange such a center attaching arrangement that it may be associated with a vehicle frame that is disposed comparatively close to the surface over which the vehicle is to move and yet so constitute the arrangement that, by resorting to brackets of appropriate dimensions, the arrangement may be attached to a vehicle frame that is spaced comparatively remote from the surface over which the same is to move so as to thereby enable the spring suspensions per se to be fabricated from identical parts.

Still further objects of this invention are to enable a tandem spring suspension, having the hereinabove described advantageous fulcruming action, to be so arranged that the wheels mounted on the rearwardly disposed axle will accurately track or follow the path of turning movement of the vehicle of which the suspension is a part, and to so arrange the tandem suspension that, in turning movements of the vehicle, the wheels supported by the rear axle of the tandem suspension may caster and thereby avoid scuffing of the tires mounted on such wheels over the surface being traversed thereby.

A yet further object of the invention is to so arrange the torque arms in a tandem suspension of the aforesaid kind and through which the axle supports are secured to a center support of the kind referred to hereinabove, as to insure movement of the axles in vertical planes as incident to passage of wheels carried by the axle over uneven surfaces and a related object is to afford a parallelogram arrangement to effectuate this in which the torque arms for the respective axles are arranged in parallel relation and have the ends thereof pivotally connected to the center support arrangement and to brackets associated with the axle with which such torque arms are to cooperate respectively.

A still further object of this invention is to equip a tandem spring suspension of the aforesaid character with an arrangement which will effectively resist rebound tendencies set up in a spring suspension of the aforesaid character in the course of use thereof.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

Figure 3:
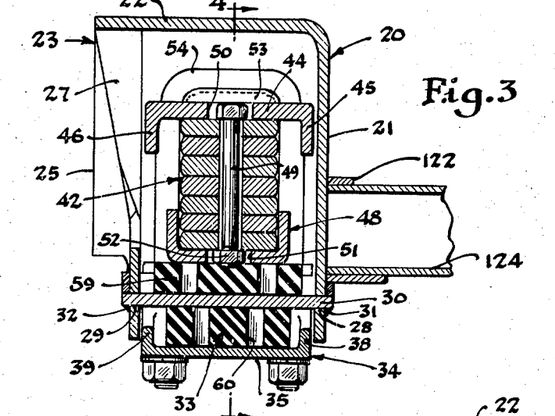
Fig. 3 is a vertical sectional view taken substantially on the line 3—3 on Fig. 1.

In the embodiment of the invention shown in the accompanying drawings, a center support or attaching bracket, generally indicated by 20, is provided. Desirably this bracket is formed from steel plates or other rigid and strong material but it is within the purview of my invention to resort to one or more castings to afford the center bracket. In the present instance, however, a plate is bent to afford a vertically extending rear wall as 21 and a horizontal top wall 22, as best shown in Fig. 3. A front plate, generally indicated by 23, affords the front wall of the center bracket 20. The plate 23 includes side walls 24 and 25, Fig. 6, which have the upper parts of outer free edges thereof aligned with the free edge of the top wall 22 (see Fig. 3) and these side walls extend inwardly from the free edge of the top wall 22. The upper portion of the front plate 23 is slotted and the marginal portions 26 and 27 adjacent to this slot are bent outwardly to afford reinforcing ribs, Figs. 1 and 6, and the upper portions thereof extend parallel with the side walls 24 and 25 and abut the lower face of the top wall 22. As best shown in Fig. 3, the front edges of the marginal portions of 26 and 27 are tapered inwardly and the arrangement is such that effective reinforcement of the front plate 23 is afforded thereby. The upper ends of the side walls 24 and 25 and the marginal portions of 26 and 27 abut and are welded to top wall 22 whereby a rigid bracket substantially U-shaped in a vertical plane is afforded.

Figure 4:
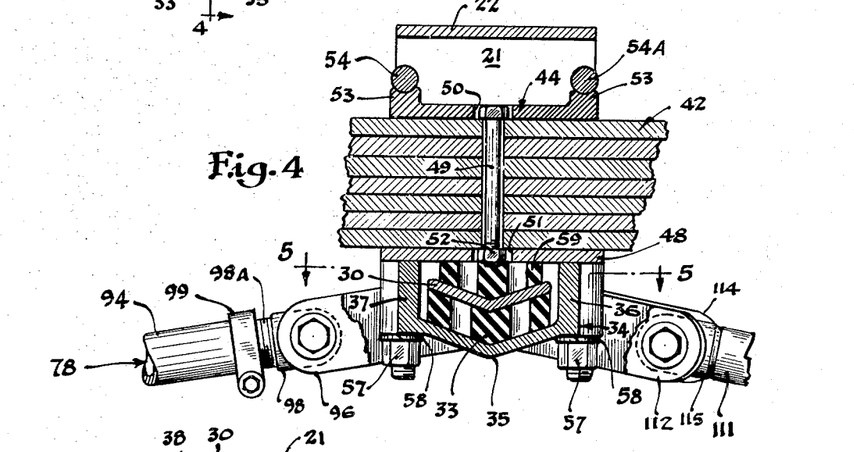
Fig. 4 is a vertical sectional view taken substantially on the line 4—4 on Fig. 3.

Aligned openings 28 and 29, Fig. 3, are respectively formed in the rear wall 21 and the front wall 23 adjacent to the lower free edges of these walls. A plate 30, affording a strut, is passed through these openings and is extended slightly beyond the outer faces of the walls 21 and 23 and desirably this plate is attached to the walls 21 and 23 by welds as 31 and 32. By referring to Figs. 1 and 4, it will be seen that the bottom plate or strut 30 is of substantially V-shaped configuration and is arranged to have the apex thereof downwardly directed as best shown in Fig. 4. The plate 30 not only affords a strut for purposes to be explained hereinafter; but, inasmuch as this plate is welded to the walls 21 and 23, it becomes a part of the center bracket 20 and serves to impart rigidity thereto, especially in the lower portion thereof where the plate 30 is located.

Figure 8:
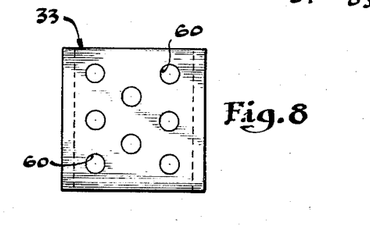
Fig. 8 is a detail plan view of a resilient pad employed in my novel suspension.

An important aspect of my invention is that a resilient and flexible pad is associated with the strut or plate 30 to serve as a load cushioning member under light load conditions in the vehicle to which the bracket 20 is to be attached as is explained hereinafter. Moreover, the pad 33 serves as a support about which the spring means 42 may fulcrum as a beam as is explained in detail hereinafter. As best shown in Figs. 3 and 8, the resilient pad 33 is substantially rectangular in outline and is of a width substantially less than the extent of the plate 30 as best shown in Fig. 3.

Figure 9:
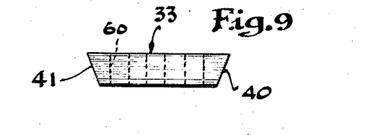
Fig. 9 is a side elevational view of the resilient pad looking in at the lower end of the pad as it is shown in Fig. 8.

In order to retain the flexible pad 33 in association with the plate or strut 30 and couple the spring means thereto, a retainer or coupler 34, Fig. 3, is provided which includes a wall, or retaining element 35, Fig. 4, of V-shaped configuration to be complemental in cross section with the V-shaped configuration of the plate or strut 30. The retainer 34 also includes a rear wall 36 and a front wall 37 (Figs. 4 and 5) which, as will be explained presently, have the upper ends thereof engaged with the relatively elongated spring means 42. The retainer 34 also includes side walls 38 and 39 (Figs. 3 and 5) which are respectively disposed inwardly of but adjacent to the lower portions of the rear wall 21 and the front wall 23 of the bracket 20. As best shown in Fig. 3, the rectangular configuration of the resilient pad 33 is of such dimensions that edges of the pad adjacent to the walls 38 and 39 are spaced inwardly therefrom for a purpose that will be described presently. As best shown in Fig. 4, the pad 33 is disposed between the adjacent faces of the V-shaped plate or strut 30 and the wall or retainer element 35 of the retainer 34 and this pad, when secured between these elements, will assume the V-shaped configuration of such elements. Consequently, and as best shown in Fig. 9, the resilient pad 33 is formed to include tapered end walls 40 and 41 and the angularity of such walls is related to the V-shaped configuration of, for example, the strut 30, so that when the pad 33 is confined between the strut 30 and the wall 35, the end walls thereof will be disposed in vertical planes, especially since the pad 33 is to be placed under compression when it is mounted as aforesaid in the center attaching bracket 20.

Figure 1:
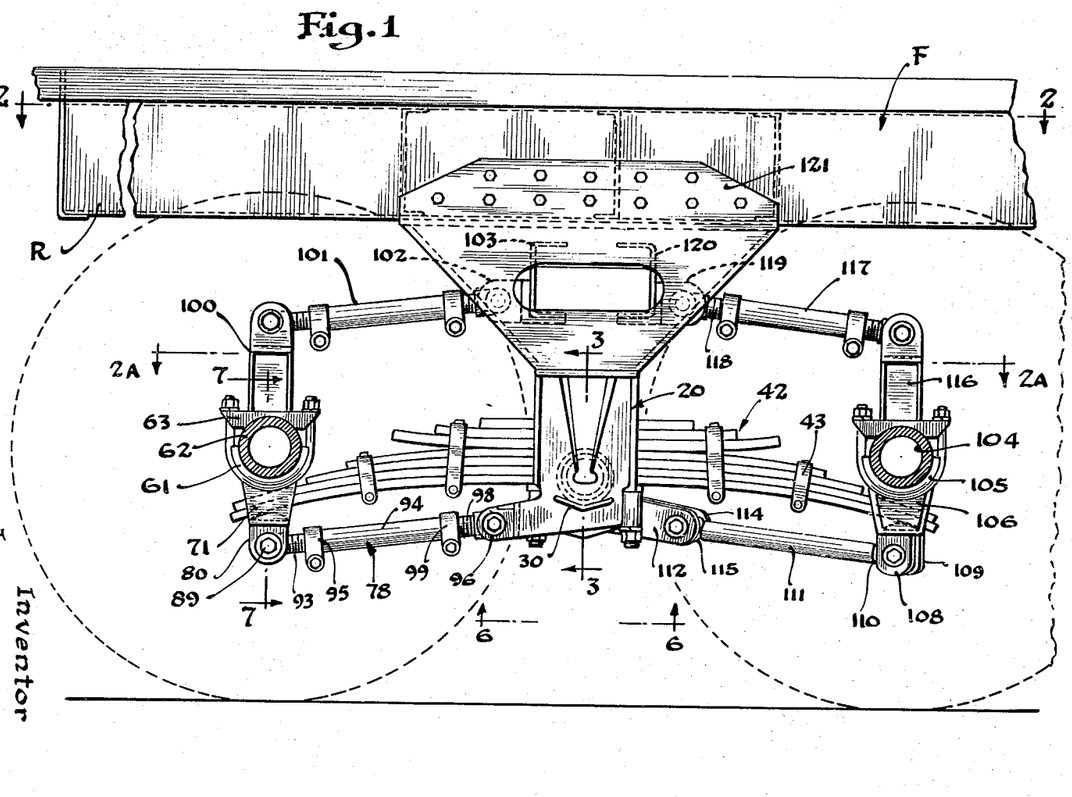
Fig. 1 is a side elevational view of my novel tandem spring suspension associated with the frame of a vehicle.

In the present instance the spring means, generally indicated by 42, that is to be associated with the bracket 20 is a multilayer leaf spring of the progressive type but it will be understood that resort could be had to other elongated spring elements without departing from the purview of my invention. The spring means 42, as best shown in Fig. 1, includes two lower leaves of substantially equal lengths and disposed thereabove are two additional leaves each of which is preferably shorter in length than the underlying leaf. A predetermined arcuate configuration is imparted to the lower leaves of the spring means 42. However, in order to afford a progressive spring, additional leaves are associated with the leaves of the arcuate configuration and are disposed thereabove. Such additional leaves may either be in the form of elongated flat plates tangential to the arcuate configuration of the underlying plates, or, as in the instance of the spring means or arrangement 42 as shown in Fig. 1, these plates may have an arcuate configuration longitudinally thereof that is opposite to the arcuate configuration of the lower leaves of the spring arrangement 42. Furthermore, such upper leaves of the spring means or arrangement are of progressively shorter length upwardly away from the lower leaves of the spring assembly. As is conventional in leaf spring structures, retaining clamps as 43 are provided at suitably spaced intervals to retain the various leaves of the spring means 42 in alignment one with the other. In the present instance such clamps as 43 are not associated with the upper leaves of the spring means 42 inasmuch as such leaves are retained in position by a portion of the clamping means that is effective to secure the retainer element 34 in association with the spring arrangement and the center bracket 20.

The spring retaining means that is a part of the aforesaid clamping means comprises a retaining plate 44 (Figs. 3 and 4) which includes depending walls 45 and 46 that are adapted to be respectively disposed in closely spaced relation with the rear wall 21 and the front wall 23 of the bracket 20 to thereby be effective to prevent undesired shifting of the spring means or assembly 42 in the bracket 20. Yet, further, to insure proper orientation of the medial part of the spring assembly 42 in the bracket 20, a lower spring clamp, generally indicated by 48, is provided which, as best shown in Fig. 3, is of substantially U-shaped configuration to include a bight portion that is coextensive with the width of the plates or leaves of the spring assembly 42 and which has limb portions that extend over the edges of the lower plates of the assembly 42 in close proximity thereto. To insure that the plates or leaves of the spring assembly 42 remain in predetermined relation, one with the other, a bolt 49 is passed through openings in the plates or leaves of the spring means provided substantially midway of the side edges thereof and at the medial parts of the leaves. A centrally located opening 50 is provided in the plate 44 to, in this instance, receive the head of the bolt 49. A centrally located opening 51 in the bight portion of the spring retainer 48 accommodates a nut 52 which is threaded on to the lower end of the bolt 49. When the nut 52 has been properly tightened on the bolt 49 to bring the leaves of the arrangement 42 into tight engagement one with the other, it is advantageous to peen the end of the bolt extending beyond the nut to thereby prevent inadvertent displacement of the nut from the bolt.

Figure 5:
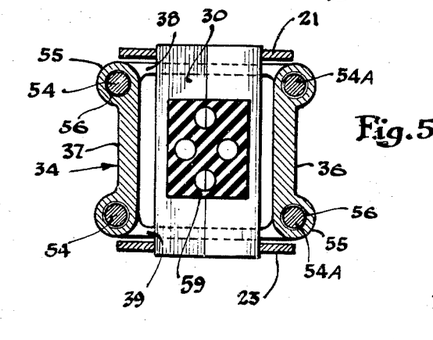
Fig. 5 is a sectional view taken substantially on the line 5—5 on Fig. 4.

In order to insure that retainer plate 44 remains in tight engagement with the upwardly disposed face of the upper leaf of the spring means or assembly 42 and to maintain the bight portion of the spring retainer 48 in tight engagement with the lower face of the lowermost leaf of the spring assembly, resort is had to clamping means which, in addition to this function, serve to secure the retaining element 34 in proper relation with the spring assembly 42, the resilient pad 33, and the center bracket 20. To this end, ribs as 53, Fig. 4, are provided on the upper face and along opposite edges of the retainer plate 44. Advantageously, the upper edges of the ribs 53 are of arcuate configuration to be complemental to the bight portion of a clamping element of cylindrical cross section and additionally, as shown in Fig. 3, the end portions of the ribs as 53 are rounded to be complemental to arcuate bight portions of the clamping element interconnecting limb portions thereof, such a clamping element being indicated by 54 in the accompanying drawings. As best shown in Fig. 5, the retainer element 34 has ears as 55 at each of the four corners thereof which have openings as 56 therein through which the limb portions of the clamping element as 54 are extended. The clamping element 54 passes through openings as 56 at one side of the retainer element 34, while a clamping element 54A passes through openings as 56 afforded at the other side of the retainer element 34, as best shown in Fig. 5. Nuts as 57 are mounted on the screw threaded lower end portions of the limbs of the clamping elements as 54 and desirably lock washers as 58 are provided so as to prevent undesired displacement of the nuts as 57.

As will be explained in detail presently, it is advantageous to maintain the pad 33 under compression at all times. Hence, the thickness of this pad, prior to assembly in the apparatus, is greater than the distance between adjacent faces of the retainer element 35 and the strut 30 at the time the upper ends of the walls 36 and 37 engage, and are clamped to, the lower face of the spring retainer 48 when the nuts 57 are tightened on the threaded free ends of the limbs of the clamping elements as 54. Consequently, when the parts are assembled, as shown for example in Fig. 4, the pad 33 is compressed between adjacent faces of the wall 35 and the strut 30.

In the present instance, however, the pad 33 is maintained compressed, not only by being squeezed between the wall 35 and the strut 30, as just described, but also by resorting to a pad 59 which acts as a rebound pad, as is explained hereinafter. This pad 59 is preferably of rectangular configuration in plan, and one dimension is of greater extent than the bight portion of the retainer element 48, as best shown in Fig. 3, while the other dimension thereof is of less width than the strut 30, as best shown in Fig. 4. Desirably, each of the pads 33 and 59 is formed from suitably compounded natural rubber but it will be understood that resort could be had to pads of other material or to other flexible means such as metallic springs disposed in appropriate relation with the elements with which the pads 33 and 59 co-operate. The vertical dimension of the walls 36 and 37 of the retaining element 34 is related to the volume of the chamber on opposite sides of the strut 30 and which has the bight portion of the spring retainer 48 as the upper wall thereof and the retaining element 35 of the retaining means 34 as the lower wall thereof. The dimensions of the substantially rectangular pads as 33 and 59 both, insofar as the cross sectional configuration and the thickness thereof may be concerned, are related to the volume of the portion of aforesaid chamber in which these pads are to be disposed respectively on opposite sides of strut 33. Especially the thickness of the pads 33 and 59 is such that when the nuts as 57 are tightened in position on the limb portions of the clamping elements as 54, each of the pads 33 and 59 is placed under compression; this being insured by the engagement of the upper edges of the walls as 36 and 37 with the lower face of the bight portion of the spring retainer 48 as shown, for example, in Fig. 4. Furthermore, when this engagement is effected, the clamping elements as 54 are effective to securely clamp the medial portions of the leaves of spring assembly 42 in tight engagement one with the other. Yet further, when the plate 44 and the bight portion of the spring retainer 48 are tightly engaged with the adjacent faces of the leaves of the spring assembly 42 disposed adjacent thereto, the extent of the plate 44 and the bight portion of the spring retainer 48 along the extent of the springs is such as to insure that the spring means or assembly 42 may act as a beam for purposes that will be explained hereinafter.

It should be noted that the assembly secured by the clamping elements 54 is supported in the center bracket 20 solely by the strut 30. Resultantly this assembly may cant in the bracket 20, particularly against the effect of the pad 33. Such canting of this assembly causes the material of the pad 33 to, in effect, flow since canting of the assembly toward the right, as viewed in Fig. 4, will tend to compress the right-hand portion of the pad 33, and at the same time the left-hand portion is relieved of compression. In order to insure proper flow of the material of the pad as 33 under such conditions, I have found it advantageous to core the pad by providing openings 60, Figs. 3 and 8, at selected positions in the pad and which extend therethrough. It is likewise advantageous to similarly core the pad 59. The coring of the pad as 33 and the dimension thereof across the strut 30 are related to the extent of compression to which the pad as 33 will be subjected in the canting of the assembly that is interconnected by the clamping means as 54. Thus, by providing but a few openings as 60, the permissible degree of compression thereof is limited and conversely this may be increased by affording a relatively large number of openings as 60 in the pad.

The resilient pad as 33 constitutes a resilient suspension for the vehicle with which my novel spring suspension is associated, and road-encountered vibrations and stresses are transmitted thereto through the transmitting plate 35 of the coupler 34. Thus, the spring assembly as 42 may be arranged to be relatively powerful to such an extent that this assembly remains relatively rigid and does not afford the resilient support for the vehicle until a predetermined load is borne by the vehicle. Consequently, prior to the time the spring assembly as 42 becomes effective, the resilient pad as 33 affords the desired resiliency and resultantly this pad is the effective resilient means when the vehicle is empty or lightly loaded. It is for this reason that it is advantageous to distribute openings as 60 throughout the pad as 33 because such openings afford areas into which the material of the pad 33 may move or flow and therefore a cored pad as 33 affords a true spring effect without being subjected to shear strains and the like.

While resort may be had to various arrangements to mount the axles in a tandem spring suspension, I have found it to be advantageous to resort to a paralellogram arrangement which will insure that the axles move in substantially a vertical plane when the wheels carried by such axles are passing over an uneven or rough surface and one form of such an arrangement is shown in the accompanying drawings. This arrangement includes sets of upper and lower torque arms. Corresponding ends of the torque arms of one such set are connected to the front or forward axle while corresponding ends of the torque arms of the other set are connected to the rear axle in the tandem spring set suspension. In the illustrated form of my invention the axles are in the form of tubes, there being a front axle tube 62 and a rear axle tube 104, Figs. 2 and 2A. Moreover, and as is conventional in the art, the end portions of each such axle tube are each arranged to have a suitable bearing structure associated therewith and on which the vehicle wheels are respectively mounted and any conventional bearing arrangement of this kind is useful with the present invention.

Figure 2:
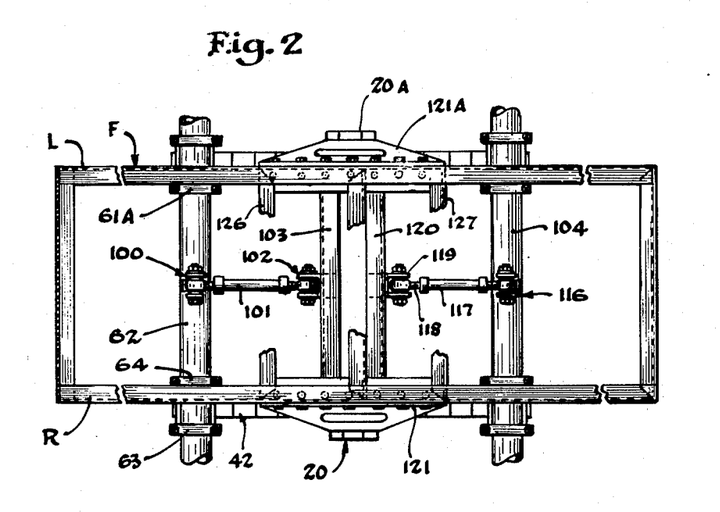
Fig. 2 is a top plan view of the arrangement shown in Fig. 1 and which is taken on the line 2—2 on Fig. 1.
Figure 2A:
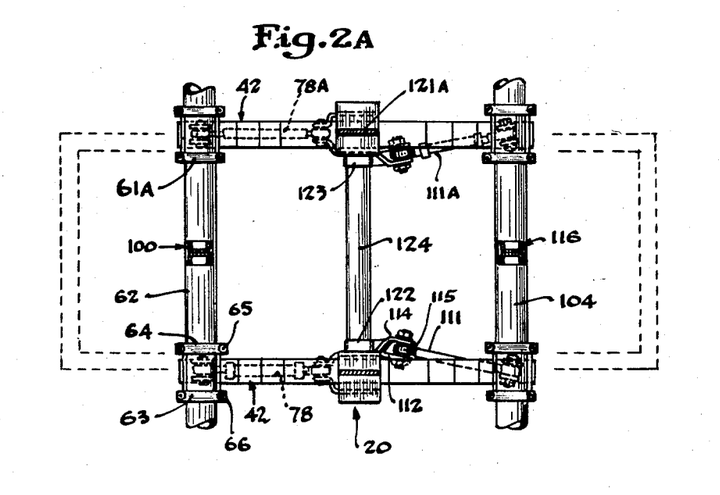
Fig. 2A is a horizontal view taken on the line 2A—2A on Fig. 1.

As best shown in Figs. 2 and 2A, the axle tubes 62 and 104 extend between assemblies each including a spring means as 42 and a center support as 20. The supports as 20 and 20A are respectively connected to opposite side members R and L of the frame F of the vehicle with which my novel suspension is to be used. Suitable connecting elements are provided on the axle tubes as 62 and 104, there being such a connecting element at the free ends of each spring means as 42 in each assembly including a center support or bracket 20. The connecting element on the axle tube 62 at the forward end of the spring means 42 shown in Fig. 1, which is to be connected to the side member R of the frame F, is shown best in Figs. 1, 2, 2A and 7.

Figure 7:
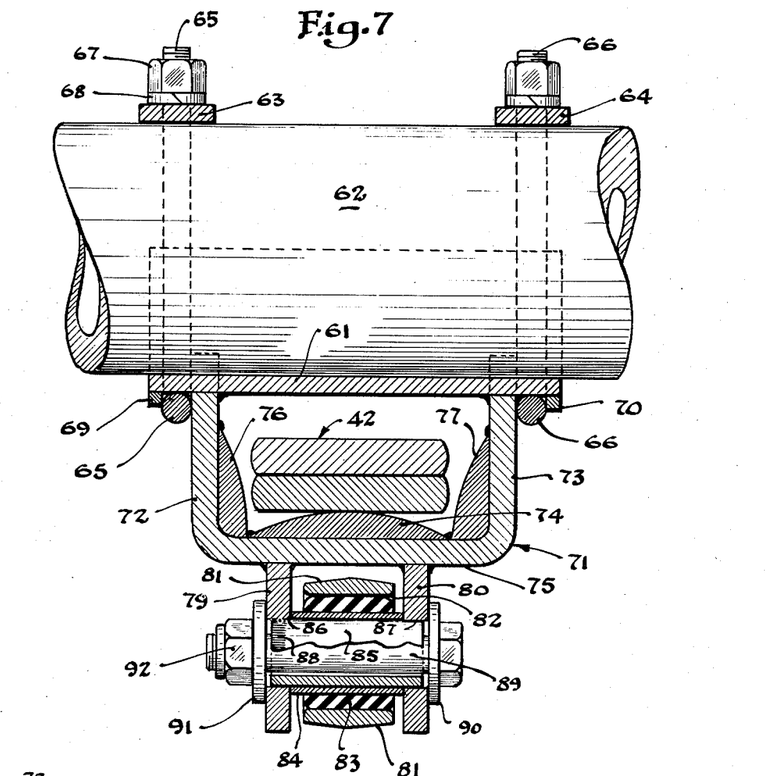
Fig. 7 is a vertical sectional view taken on the line 7—7 on Fig. 1.

This connecting element includes a saddle 61 disposed beneath the axle tube 62 at the appropriate position thereon and clamp plates 63 and 64 are disposed on the axle tube 62 to be, respectively, substantially in alignment with the opposite ends of the saddle 61. The respective bight portions of U-bolts as 65 and 66 are engaged with the saddle 61 immediately inwardly of the opposite ends thereof and the limb portions of the U-bolts 65 and 66 are respectively passed through openings in the clamp plates 63 and 64 to have the threaded end portions thereof extended above such clamp plates. A nut as 67 is run on to the exposed threaded end of each such limb portion and a lock washer as 68 is disposed between the nut as 67 and the top of the underlying clamp plate to retain the nut 67 in tightened position upon the threaded end portion of each limb of the U-bolt as 65. When the nuts as 67 are in a tightened position, the axle tube as 62 is securely clamped between the saddle 61 and the clamp plate 63 to be held against relative movement. To insure against displacement of the U-bolt 65 from the end portion of the saddle 61, a flange 69 is welded or otherwise suitably secured to the adjacent end of the saddle 61 and such flange extends outwardly of the saddle to be effective to prevent the U-bolt as 65 from passing over the adjacent end of the saddle. A similar flange as 70 is provided at the opposite end of the saddle to perform a similar function with respect to the U-bolt 66. In order to further insure against relative movement between the axle tube 62 and saddle 61, it is advantageous to interconnect these elements as by welding the same one to the other.

A substantially U-shaped stirrup, generally indicated by 71, is disposed beneath the saddle 61, and the limbs 72 and 73 of this stirrup are engaged immediately and respectively inwardly of the U-bolts 65 and 66 and the upper ends of these limbs are welded or otherwise suitably interconnected to the saddle 61. A bearing plate 74, of substantially hemispherical cross section, has the flat lower face thereof welded or otherwise suitably secured to the upper surface of the bight portion 75 of the stirrup 71, whereby a rounded surface is afforded to be engaged by the lower face of the lower leaf of the spring arrangement 42 which, as best shown in Fig. 1, is preferably so mounted and extended that one or more of the leaves thereof extend through and beyond the stirrup 71. This arrangement is effective to connect the axle tube as 62 to one end of the spring assembly 42.

It has been found to be advantageous, under some conditions, to limit the transverse movement of an axle or axle tube as 62 relative to the leaves of the spring assembly as 42 that are extended into and through a stirrup as 71. This may be effected by inclining the arms as 72 and 73 of a stirrup as 71 outwardly and away from each other so that the lower portions of such arms will be disposed in closely spaced relation with the side edges of the leaves of the spring assembly in the stirrup. In the present instance, however, plates as 76 and 77 are welded to the inner faces of the arms 72 and 73 and the portions of the bight 75 disposed outwardly of the bearing plate as 74. The inner faces of side plates as 76 and 77 are desirably of arcuate configuration so that the lower portions of such plates are disposed in close proximity to the respective side edges of the spring leaves in the stirrup, while the upper portions of such side plates are spaced well away from such side edges of the spring leaves. The advantage of this arrangement will be discussed hereinafter.

An arrangement such as that just described is afforded on the axle tube 62 at the forward end of the spring means associated with the center support or bracket 20A that is secured to the side member L of the frame F.

It is of course important that a front axle tube as 62 be disposed in right-angular relationship with the center line of the direction of travel of the vehicle of which the frame F is a part. Moreover, the strains to which an axle as 62 will be subjected are advantageously dissipated through what are customarily called torque arms. At least one of such torque arms is so arranged that the length thereof may be adjusted, and resort is had to this adjustment to establish the aforesaid right-angular relationship between the axle 62 and the center line of the direction of travel of the vehicle.

In the present instance, an adjustable torque arm 78 is extended between the lower portion of the center bracket as 20, Fig. 1, and the stirrup 71. To this end, side plates or ears 79 and 80, Fig. 7, are welded to the outer face of the bight portion 75 of the stirrup 71 in spaced apart relation one with the other. A connector 81 is provided for the forward end of torque arm 78 and this connector 81 is disposed between the ears 79 and 80. The main body portion of the connector 80 is of cylindrical configuration and has an opening 82 therein in which an annular sleeve or bushing 83 of a resilient material such as rubber is secured. A sleeve 84, of a material having good wearing properties, is passed through a medially located opening in the bushing 83 and advantageously the bushing 83 is bonded to the periphery of the sleeve 84 in any suitable way. As best shown in Fig. 7, the sleeve 84 extends outwardly of each end of the bushing 83 and advantageously the sleeve 84 is of a length equal to the distance between the inner faces of the ears 79 and 80 and has the bushing 83 centered thereon between the ends thereof. A spacer sleeve 85 is extended through the sleeve 84 and is of sufficient length to project beyond opposite ends of the sleeve 84 whereby the end portions of this sleeve may be respectively disposed in openings 86 and 87, respectively provided in the ears 79 and 80. Advantageously the periphery of the spacer sleeve 85 is serrated as indicated at 88 and the diameter of the spacer 85 is so related to the diameter of the opening 86 that when the serrated end portion 88 is driven into the opening 86, the spacer sleeve 85 is secured against rotation in the openings 86 and 87. A bolt 89 is passed through the spacer sleeve 85 and a washer 90 is disposed between the head of the bolt 89 and the outer face of the ear 80. The threaded free end portion of the bolt 89 extends beyond a washer 91 engaged with the outer face of the ear 79 and a self-locking nut 92 is mounted on the threaded end portion of the bolt 89 and when this is tightened, the assembly is secured in position and the connector 81 is pivotally connected to the stirrup 71. The connector 81 may oscillate about the spacer sleeve 85 in the course of the operation of the spring suspension of which the just described interconnection is a part especially when such oscillatory movement of the connector 81 is not absorbed by the hysteresis of the bushing 83.

The connector 81 has a threaded boss 93 extended therefrom that is adapted to be threaded into one end of connector tube 94 of the adjustable torque arm 78. The end portion of the tube 94 is slotted inwardly from the free end thereof so that when tube clamp 95 is disposed about the end portion of the tube 94 adjacent to the boss 93 and is tightened, this end portion of the tube is secured against relative movement with respect to the boss 93. This arrangement is disclosed and described in detail in my copending application, Serial No. 595,288, filed July 2, 1956, now Patent No. 2,880,991, dated April 7, 1959.

Figure 6:
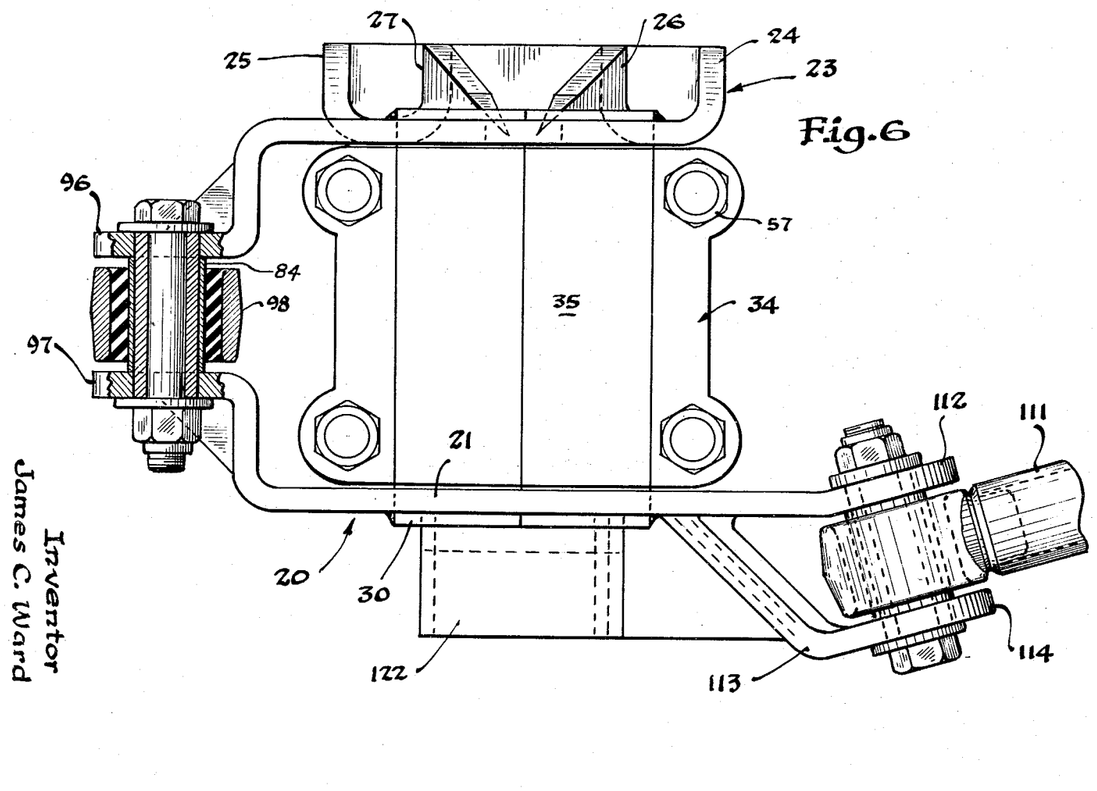
Fig. 6 is a bottom plan view taken substantially on the line 6—6 on Fig. 1.

As best shown in Figs. 1 and 6, the lower end portions of the front plate 23 and the rear plate 21 of the center bracket 20 are first bent inwardly and then outwardly to afford spaced apart ears 96 and 97 which correspond to the ears 79 and 80 afforded on the stirrup 71. A connector 98, corresponding to the connector 81, is mounted between the ears 96 and 97 in the manner described hereinabove with particular reference to the mounting of the connector 81 between the ears 79 and 80. The connector 98 disposed between the ears 96 and 97 includes a threaded boss 98A. The threads afforded on the boss 98A have a lead opposite to the lead of the threads on the boss 93 and the end portion of the tube 94 that is to be threaded on to the boss 98A has screw threads therein that are complemental to the screw threads on the boss 98A. A clamp 99 similar to the clamp 95 is associated with the portion of the tube 94 that is threaded on to the boss 98. When the clamps 95 and 99 are released, the tube 94 may be rotated and by reason of the oppositely directed screw threads at the respective ends thereof, such rotation of the tube 94 causes the threaded bosses as 93 and 98 to move inwardly or outwardly of the tube 94 dependent upon the direction of rotation, and thereby an adjustment in the length of the torque arm 78 is afforded, this being described in detail in my aforesaid copending application.

Resort is had to this adjustment of the torque arm 78 to effect the above described and desired alignment of the axle 62. Of course, when the desired adjustment has been effected, the clamps 95 and 99 are tightened so that thereafter the torque arm 78 functions as a rigid member.

It has been described hereinabove that it is advantageous to so mount the axle tube 62 that the same may be caused to move in a substantially vertical plane as in those instances where movement of the axle is induced by the movement of the wheels carried thereby over a rough or uneven surface. To this end, resort is had to a parallelogram arrangement. If so desired, such a parallelogram arrangement could be afforded by mounting a torque arm similar to the torque arm 78 in vertical alignment therewith. It should also be noted that another torque arm 78A will be associated with the axle saddle 61A (Figs. 2 and 2A) that is provided on the axle tube 62 to be aligned with the side member L of the frame F of the vehicle. This torque arm may be adjustable in nature, as is the torque arm 78, but advantageously resort will be had to a rigid torque arm at such other side of the vehicle, such a rigid torque arm being described in further detail hereinafter. The torque arm 78A extends between and is connected to the axle saddle 61A and the center bracket 20A (that is connected to the side member L of the frame F) in the manner described hereinabove with reference to the torque arm 78. Moreover, the torque arms 78 and 78A are disposed and arranged to lie in a common plane. Since, therefore, there will be a torque arm connected to the axle tube 62 beneath the same on each side of the spring suspension assembly, the aforesaid desired parallelogram may be afforded by providing a single torque arm above the axle tube 62, and in the present instance such a torque arm is disposed substantially midway between the points at which the torque arms at opposite sides of the suspension assembly are connected to the axle tube 62.

Thus, an upstanding bracket 100 is welded or otherwise connected to axle tube 62 in the aforesaid midway position. One end of an adjustable torque arm 101 is connected to a yoke afforded at the upper end of the bracket 100 in the same manner as that in which one end of the torque arm 78 is connected to the yoke afforded by the ears 79 and 80 as described hereinabove. In the present instance the other end of the torque arm 101 is connected to a bracket 102 also in the same manner as that in which the torque arm 78 is connected to the yoke afforded by the ears 79 and 80. As shown, the bracket 102 is connected to a channel-shaped beam 103 that extends between spacer brackets through which center brackets 20 and 20A are connected to the side member R and L of the frame F of the vehicle, such spacer brackets being described hereinafter. The bracket 102 is so connected to the beam 103 that the torque arm 101 is disposed in a plane parallel to that in which the torque arms 78 and 78A are disposed and thereby a parallelogram arrangement is afforded.

A rear axle tube 104 is provided which has a saddle 105 connected thereto in the same manner in which the saddle 61 is connected to the axle tube 62 and the saddle 105 is connected to the axle tube 104 as to be in alignment with the connection of the saddle 61 to the axle tube 62. The saddle 105 has a stirrup 106 connected thereto as by welding or the like. However, for the purpose to be explained presently, the stirrup 106 is so arranged that the ears 108 and 109 carried thereby are arranged in angular relationship with respect to the center line of the axle tube 104. A connector 110 at one end of a rigid torque rod 111 is disposed between the ears 108 and 109 and is mounted between these ears in the same manner as that in which the connector 81 is mounted between the ears 79 and 80 as described hereinabove. Furthermore, as best shown in Figs. 1 and 6, an extension at the lower end of the rear wall 21 has the free end portion 112 thereof inclined relative to the plane of the wall 21. An angle plate 113, Fig. 6, is welded or otherwise secured to the outer face of the rear wall 21 and includes an end portion 114 that is disposed in parallel relation with the end portion 112, and these inclined end portions 112 and 114 afford ears between which a connector 115, Fig. 1, at the end of the torque rod 111 opposite that whereat the connector 110 is provided, may be disposed. As in the instances of other connectors provided at the end of a torque rod, the torque rod 111 has a connector that is mounted between the ears 112 and 114 in the same manner as that in which the connector 81 is mounted between the ears 79 and 80. The angular inclination of the ears 108 and 109 and the ears 112 and 114 is such that the rigid torque rod 111 extends therebetween and in parallel relation with the angular inclination of such ears and, as stated hereinabove, the purpose of such angular inclination of torque rod 111 will be explained hereinafter. The details of the construction of a rigid torque arm 111 are described in my aforesaid copending application.

Inasmuch as a rigid torque rod as 111 is associated with the center bracket 20 that is to be connected to the side R of the frame F, a corresponding torque rod 111A, associated with the center bracket 20A that is to be connected to the side L of the frame, is arranged to be adjustable, such arrangement corresponding to that of the adjustable torque rod 78 described hereinabove. The rigid torque arm 111 and the adjustable torque arm 111A at the opposite side of the frame are disposed to lie in a common plane. It is advantageous to resort to a parallelogram arrangement for the axle tube 104. To this end adjustable torque rods may be respectively disposed in vertical alignment with the rigid torque rod 111 and the adjustable torque rod 111A. Since, however, resort can be had to a single adjustable torque arm above the axle tube 104, as was done in the instance of torque rod 101 associated with the axle tube 62, a bracket 116 is welded or otherwise secured to the axle tube 104 in alignment with the bracket 100 mounted on the axle tube 62. One end of an adjustable torque rod 117 is connected to a yoke at the upper end of the bracket 116 in the same manner as that in which the connector 81 was mounted between the ears 79 and 80 and a connector 118 at the opposite end of the adjustable torque rod 117 is similarly mounted in a yoke afforded on a bracket 119 that is secured to a cross beam 120 that is mounted in a manner similar to the manner in which the cross beam 103 is mounted. Here also the bracket 119 is so connected to the beam 120 that the adjustable torque arm 117 lies in a plane parallel with the plane in which the torque arms 111 and 111A are disposed and thereby a parallelogram support for the axle tube 104 is afforded.

In some circumstances, all of the torque arms mounted beneath the axles of the suspension may be of the adjustable type. This is not necessary, however, and resort may be had to the use of sets of adjustable and rigid torque arms described hereinabove. Moreover, and as is often done, the torque arms connected to a center bracket as 20 may both be of the rigid type and, in such circumstances, the torque arms connected to a center bracket as 20A will be of the adjustable type. It will be understood also that this arrangement could be reversed.

One of the important advantages of the present suspension is that the same may be connected to a vehicle frame having the lower surface thereof disposed close to the horizontal center plane in which the axle tubes 62 and 104 are disposed when the wheels carried thereby are resting on the same level surface. It has been determined, however, that a minimum spacing must be maintained between the lower surface of the frame and the aforesaid horizontal center plane of the axle tubes as 62 and 104, and this minimum distance is represented by the distance that the top walls of the center brackets are spaced above the aforesaid horizontal center plane. The degree of such minimum spacing is that required to accommodate relative movement between the parts of the suspension and the frame occurring as an incident to travel of the vehicle including the present suspension, the degree of such spacing being such that the required relative movement may occur without engagement between the elements of the suspension and the frame in the course of vehicle movement so as to thereby assure proper functioning of the suspension. When this is established, the suspension may be associated with a vehicle having the lower surface of the frame thereof disposed in relatively close proximity to the surface over which the vehicle is to travel. By disposing the top plates of the center brackets in such a position, it is possible to utilize my spring suspension in association with a vehicle arranged as just described, and yet the suspension can be utilized with vehicles wherein the lower frame surface is disposed comparatively remote from the surface over which the vehicle is to move. The foregoing enables my spring suspension to be used in a wide variety of circumstances without alteration of the suspension. However, in order that my suspension may be used with vehicles that have the frames thereof spaced from the surfaces over which they are to move in varied amounts, I provide spacer brackets of proper dimensions. Hence, the only variation required to enable my spring suspension to be used with a wide variety of vehicles is a variation in the spacer brackets that are employed to connect my suspension to the frame of the vehicle. In the instance of a vehicle having the lower surface of the frame thereof spaced from the surface over which it is to move in the minimum amount, each center bracket as 20 is directly connected to the frame of such a vehicle. However, in those vehicles wherein the spacing is greater than the minimum, I provide spacer brackets of proper dimensions that will enable the frame of the vehicle to be supported a desired distance above the surface over which it is to move and yet have my novel spring suspension associated therewith.

Consequently, in the instance of the vehicle having frame F as illustrated in the accompanying drawings, I provide a spacer bracket 121 which includes a flange that may be disposed against the outer face of the frame F to be secured thereto as by being bolted or otherwise secured. The lower portion of such bracket is welded or otherwise suitably secured to the upper wall of the center bracket 20 of my novel suspension. A similar spacer bracket is similarly associated with the frame and the center bracket 20A.

In an instance where spacer brackets as 121 and 121A are afforded, the cross beams as 103 and 120 are extended between such brackets which are respectively secured to opposite sides of a frame as F. It will be recalled that the adjustable torque rod as 101 is to be disposed in a plane parallel to the plane in which the torque rod as 78 is disposed. Consequently, when the vertical dimension of a spacer bracket is greater than that of the bracket 121, the beams as 103 and 120 will be mounted in a position more remote from the lower surface of the frame F than are the beams 103 and 120. Conversely, if the vertical dimension of a spacer bracket is less than that of the bracket 121, then the bears as 103 and 120 will be disposed in closer relation to the frame F than are the beams 103 and 120 as shown in Fig. 1. In the instance where the upper parts of the center bracket as 20 are directly connected to the frame, then the beams as 103 and 120 will be extended between portions of the frame rather than between spacer brackets as in the instance of the illustrated form of my invention.

A spring suspension like that shown in Fig. 1 is to be provided at each side of the frame as F of a vehicle with which the suspension assembly is to be associated. It is advantageous to reinforce such an assembly and to this end resort may be had to cross bracing in addition to that afforded by cross beams such as 103 and 120. Thus, a socket 122 may be provided on the rear wall 21 of the center bracket 20 and a similar socket 123 may be provided on the rear wall of center bracket 20A. Opposite ends of a reinforcing and tieing tube 124 are respectively extended into the sockets 122 and 123 and may be welded or otherwise secured therein. In this way, the elements carried by the center brackets 20 and 20A are secured together. Additional cross bracing and reinforcement may be provided by resorting to cross braces as 126 and 127 that have corresponding ends thereof welded or otherwise secured to spacer brackets as 121 and 121A or center brackets as 20 and 20A, dependent upon the manner in which my novel suspension is connected to the frame as F of a vehicle.

As explained, the upper part of the center bracket as 20 is either directly attached to the frame of the vehicle or resort is had to spacer brackets, such as 121 and 121A, which will be effective to support the frame as F of the vehicle in desired relation with the surface over which it is to move. In either case, the connection is such that the center bracket as 20 is connected to the frame as F along the longitudinal extent thereof that is most advantageously supported by the wheels carried by the suspension.

When a suspension of the aforesaid character has been connected to each side of a frame as F, the adjustable torque rod or rods as 78 associated with the front axle tube as 62 are first so adjusted as to bring the center line of the axle tube as 62 into perpendicular relationship with the center line of the path of travel of the vehicle. Thereafter, the adjustable torque rods as 111A associated with the rear axle tube as 104 are adjusted in length to bring the center line of the axle 104 into parallel relation with the center line of the axle tube 62.

As is well understood in the art, an upwardly directed camber is imparted to each axle tube as 62 and 104. The degree of such camber is related to the maximum load to be borne by the vehicle and is of such degree that when such a maximum load is impressed on the axle tubes as 62 and 104, the upwardly directed camber is substantially eliminated. As is customary in the art, each axle tube as 62 and 104 bears indicia indicating the point of maximum camber and in order to realize the advantages accruing from the parallelogram arrangement described hereinabove with reference to the axle tubes 62 and 104, it is essential to dispose such indicia on the axle tubes in the vertical center plane of the tubes. This is brought about by manipulating the adjustable torque rods as 101 and 117 and when the length of these respective rods has been so adjusted that the aforesaid indicia are properly disposed, then the clamps associated with these adjustable rods are tightened to maintain the adjusted lengths thereof. As a result of this adjustment, the respective points of pivotal connection of the ends of torque rods as 101 and 78 to an axle as 62 are disposed to lie substantially in the vertical center plane of such axle and the same result is achieved insofar as the rear axle tube 104 may be concerned. Resultantly, as the wheels carried by the axle tubes 62 and 104 move over a rough or uneven surface so as to induce vertical movement over the axle or axle tubes 62 and 104, these tubes move in substantially the vertical center planes thereof and the desired alignment therebetween is maintained with a resultant reduction on the wear of the tires on the aforesaid wheels.

As best shown in Fig. 2A, and as has been explained hereinabove, the torque arms as 111 and 111A, respectively, extended between the rear axle tube 104 and the center brackets as 20 and 20A are inclined or canted so as to extend toward each other. This relative inclination is such that extensions of the center lines of these torque arms intersect on the center line of the vehicle at a point well forward of the rear axle tube 104. Resultantly, in turning the vehicle, the rear axle tube 104 and the wheels carried thereby may caster in the course of the turn so as to follow the path of the vehicle in the turn, such castering resulting from the side thrust that is impressed upon this axle as an incident to turning of the vehicle. Were it not for the canting of the torque rods as 111 and the castering of rear axle 104 and wheels carried thereby, the tires of such wheels would scuff transversely over the surface upon which the same are traveling, this having occurred in tandem spring suspensions of the kind to which this invention relates, as these have been constructed heretofore without canted torque arms, and objectionable tire wear has often resulted from the scuffing action to which the tires have been subjected under such conditions.

As has been explained hereinabove, the spring assembly as 42 that is extended through the center bracket as 20 and which has the end portions thereof extended into and through stirrups depending below the front and rear axle tubes can be constituted and arranged as to be comparatively rigid as contrasted with spring arrangements included in tandem spring suspensions as have been constructed heretofore. In such prior tandem spring suspensions it has been necessary to compromise the degree of flexibility of the spring assemblies included therein so as to insure that the spring assemblies could accommodate the maximum load to be borne by the vehicle with which the suspension was associated and at the same time to be sufficiently flexible as to respond, to a degree at least, to empty or light load conditions in the vehicle. In so compromising the degree of flexibility of the spring arrangements, however, it has been necessary to first properly care for loaded conditions of the vehicle and resultantly such spring suspensions have not been able to accommodate the high frequency vibrations that are encountered under empty or lightly loaded vehicle conditions. This has been manifested by the objectionable bouncing of vehicles having spring suspensions when flexibility of the spring arrangements has been compromised as aforesaid. It has been observed that the aforesaid conditions frequently bring about premature fatigue and failure of the spring suspension, and also the vehicle including such prior art suspensions.

Empty and lightly loaded vehicle conditions are accommodated by my novel spring suspension since the spring assembly as 42 is sufficiently rigid that flexing thereof is not effected until a rather substantial load is being borne by the vehicle. When a vehicle is empty or lightly loaded, it is supported by the compression pad as 33, the attendant stresses being impressed upon this pad through the strut 30. The over-all volume of the pad 33 and the coring out thereof, as explained hereinbefore, determines the effective spring rate of the resilient pad as 33. This is desirably adjusted so that this pad will accommodate all load conditions in the vehicle with which my suspension is associated up to loads which induce flexing of the relatively rigid spring arrangement 42. Furthermore, by reason of the progressive effectiveness of the spring arrangement 42, satisfactory accommodation of a wide variety of load conditions is afforded. Thus, when the load conditions are such as to initiate flexing of the spring arrangement 42, only portions of such spring arrangement are brought into play; however, as the load factor increases, additional sections or leaves or plates of the spring become effective and it is this that enables effective accommodation of all conditions up to full load conditions.

One of the primary advantages accruing from the arrangement of my novel spring suspension is the effective balancing of load conditions between the two axles of the suspension. For example, a force which is effective to urge the front axle tube upwardly is transmitted through the spring arrangement 42 which acts as a beam and which fulcrums about the strut 30 and thereupon the opposite end of the spring exerts a transposing force on the rear axle tube 104 and it is this that effects relatively uniform distribution of the effect of the force acting on the axle tube as 62 as aforesaid. Of course, the converse occurs when an upwardly effective force acts on the rear axle tube 104.

Under conditions such as the foregoing where forces are being distributed to the axles through the beam action of spring assembly 42, the stresses tend to center in the medial part of the spring assembly which fulcrums about the strut 30. It should be noted that when the spring assembly 42 serves as a beam to effect distribution of the forces as above described, that this is brought about without resort to pivotal movement between the moving parts that are entailed. This occurs by reason of the fact that the beam fulcrums about the strut 30 only against the resistance of the resilient pad 33, and in these circumstances there is no relative movement that produces wear on the parts. Yet, further, the pad 33 exerts but limited resistance to the entailed motion and this contributes to effective distribution of the attendant stresses. Furthermore, such effective and proper distribution of the stresses tends to insure that the vehicle in which my novel suspension is included travels in such a way that the frame thereof remains substantially level at all times.

Yet another advantage accruing from the novel arrangement of my spring suspension is that the rebounding effects resulting from distribution of forces as aforesaid will be overcome by the resilient rebound pad 59 which effectively dissipates such rebound forces.

It will, therefore, be seen that multiple advantages accrue from resorting to placing resilient pad as 33 under compression and in association with a fulcrum as 30, especially where the spring arrangement is related to these elements as described hereinabove. Among the advantages so accruing is the accommodation of and effective and prompt disposition of high frequency vibrations that accrue under empty and lightly loaded conditions in the vehicle. In addition to this, however, by reason of the elimination of relative pivotal movement between the elements that are effective to bring about uniform distribution of the forces, prolonged service is realized from the use of my novel suspension. Still further, the arrangement of the parts that are associated with the center attaching bracket, as described hereinabove, is such that uniform distribution of impressed forces is efficiently and effectively brought about.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a spring suspension of the kind described, a bracket secured in depending relation to the frame of a vehicle, relatively elongated spring means having parts thereof extending outwardly on opposite sides of said bracket with vehicle axle connections associated with opposite ends of said spring means, coupling means including a portion spaced from said spring means, a strut supported by said bracket and disposed between said spring means and said portion of said coupling means, said strut and coupling means being configured to afford a fulcrum, flexible pad means of symmetrical construction throughout located on one side only of said coupling means and disposed between said portion of said coupling means and said strut and in engagement therewith, and means interconnecting said spring means and coupling means as a unit whereby said unit may move and pivot bodily relative to said strut against the effect of said flexible means.

2. In a spring suspension of the kind described, a bracket secured in depending relation to the frame of a vehicle, relatively elongated spring means having an intermediate part thereof disposed in said bracket with vehicle axle connections associated with said spring means adjacent the ends thereof and outwardly of said intermediate part, coupling means secured to said spring means and including a portion spaced from the intermediate part of said spring means, a strut supported by said bracket and disposed between said spring means and said portion of said coupling means, and flexible pad means of symmetrical construction throughout located on one side only of said coupling means and confined under compression between said portion of said coupling means and said strut and in engagement therewith, whereby said spring means and coupling means may move as a unit bodily relative to said strut against the effect of said flexible means.

3. In a spring suspension of the kind described, a bracket secured in depending relation to the frame of a vehicle, relatively elongated spring means having opposed parts thereof extending outwardly on opposite sides of said bracket with vehicle axle connections associated with the opposed end parts of said spring means, coupling means including a portion spaced from said spring means, a strut supported by said bracket and disposed between said portion of said coupling means and a portion of the spring means intermediate said opposed parts thereof, a relatively thick resilient pad means of symmetrical configuration and having flat surfaces under compression between and in engagement with said portion of said coupling means and said strut, said pad being located on one side only of said coupling means, and means interconnecting said spring means and coupling means as a unit whereby said unit may move bodily relative to said strut against the effect of said resilient pad.

4. In a spring suspension of the kind described, a bracket adapted for attachment to a vehicle, relatively elongated spring means having an intermediate part thereof disposed in said bracket whereby vehicle axle connections may be associated with said spring means outwardly of said intermediate part, coupling means including a portion spaced from said spring means, a strut supported by said bracket and disposed between said spring means and said portion of said coupling means, a pad of flexible material disposed between said portion of said coupling means and said strut, said pad being generally rectangular in plan and V-shaped in section and of relatively thick construction, and means interconnecting said spring and coupling means and effective to retain said pad in engagement with said portion of said coupling means and strut whereby said spring and coupling means may move as a unit bodily relative to said strut against the effect of said flexible pad.

5. A spring suspension according to claim 4 wherein the interconnecting means is effective to place the flexible pad under compression between the strut and said portion of the coupling means.

6. In a spring suspension of the kind described, a bracket adapted for attachment to a vehicle, relatively elongated spring means having an intermediate part thereof disposed in said bracket whereby vehicle axle connections may be associated with said spring means outwardly of said intermediate portion, V-shaped coupling means disposed in spaced relation with said spring means, a V-shaped strut complemental to said coupling means and attached to said bracket intermediate said spring and coupling means, V-shaped flexible means disposed between said coupling means and said strut, and means interconnecting said spring and coupling means for bodily movement in unison about said strut against the effect of said flexible means.

7. In a tandem spring suspension of the kind described, a bracket adapted for attachment to the frame of a vehicle, elongated spring means having parts thereof extending outwardly on opposite sides of said bracket, vehicle front and rear axle connections associated with said outer parts of said spring means enabling vertical axle movement to be transmitted to said spring means, coupling means including a central apex portion spaced from the medial portion of said spring means, a fulcruming strut supported by said bracket and including an apex portion disposed between said medial portion of said spring means and said portion of said coupling means, flexible means located on one side only of said coupling means and disposed between said portion of said coupling means and said strut, said flexible means being under compression in such disposition to have a predetermined spring rate, and means interconnecting said spring means and coupling means as a unit whereby said unit may fulcrum bodily as a beam about said strut as a fulcrum and against the spring effect of said flexible means to distribute between the axles heavy loads impressed vertically on one axle and whereby relatively light load axle movements are absorbed by said flexible means as an independent spring without beam action.

8. In a tandem spring suspension of the kind described, a bracket attached in depending relation to the frame of a vehicle, an elongated compound leaf spring having opposed end parts thereof extending outwardly on opposite sides of said bracket, vehicle front and rear axle spring connections including bearing plates on which said outer parts of said spring repose enabling vertical axle movement to be transmitted to said spring, said bearing plates being arcuate transversely of the parts of said spring engageable therewith to tangently support said spring, coupling means including a portion spaced from the medial portion of said spring, a fulcruming strut supported by said bracket at the lower end thereof and disposed between said medial portion of said spring and said portion of said coupling means, a resilient one-piece pad disposed between and in engagement with said portion of said coupling means and said strut, and means interconnecting said spring and coupling means as a unit whereby said unit may fulcrum bodily as a beam about said strut as a fulcrum and against the effect of said pad to distribute between the axles heavy loads impressed vertically on one axle and whereby relatively light load axle movements are absorbed by said flexible means without beam action.

9. In a tandem spring suspension of the kind described, a bracket adapted for attachment to the frame of a vehicle, an elongated compound spring having parts thereof extending outwardly on opposite sides of said bracket, vehicle front and rear axle spring connections associated with said outer parts of said spring enabling vertical axle movement to be transmitted to said spring, said spring connections each including a bearing plate on which an outer part of said spring is adapted to repose and side plates limiting the extent of lateral shift of such outer part of the spring, said bearing plates each being arcuate transversely of the part of the spring engageable therewith to tangently support the spring, said side plates being inclined outwardly in a direction proceeding away from said bearing plate, coupling means including a portion spaced from the medial portion of said spring, a fulcruming strut supported by said bracket and disposed between said medial portion of said spring and said portion of said coupling means, flexible means disposed between said portion of said coupling means and said strut, and means interconnecting said spring and coupling means as a unit whereby said unit may fulcrum bodily as a beam about said strut as a fulcrum and against the effect of said flexible means to distribute between the axles heavy loads impressed vertically on one axle and whereby relatively light load axle movements are absorbed by said flexible means without beam action.

10. In a tandem spring suspension of the kind described, a bracket attached in depending relation to the frame of a vehicle, elongated spring means having opposed end parts thereof extending outwardly on opposite sides of said bracket, vehicle front and rear axles having axle connections associated with said outer parts of said spring means and enabling vertical axle movement to be transmitted to said spring means, means associated with said axles providing vertically spaced attachments for ends of torque arms, means secured to the frame of the vehicle providing similarly spaced attachments for opposite ends of such torque arms, torque arms for each axle coupled in parallelogram arrangement to said torque arm attachments, coupling means including a portion spaced from said spring means, a strut supported lower end of said bracket and disposed between said spring means and said portion of said coupling means, a relatively thick resilient pad located on one side only of said coupling means and disposed between said portion of said coupling means and said strut and having opposed sides respectively in engagement therewith, and means interconnecting said spring means and coupling means as a unit whereby said unit may move bodily as a unit relative to said strut and against the effect of said resilient pad at times of vertical axle movement.

11. In a tandem spring suspension of the kind described, a bracket adapted for attachment to the frame of a vehicle, elongated spring means having parts thereof extending outwardly on opposite sides of said bracket, vehicle front and rear axles having axle connections associated with said outer parts of said spring means and enabling vertical axle movement to be transmitted to said spring means, means associated with said axles providing vertically spaced attachments for ends of torque arms, means secured to the frame of the vehicle providing similarly spaced attachments for opposite ends of said torque arms, torque arms for each axle coupled in parallelogram arrangement to said torque arm attachments, coupling means including a portion spaced from the medial portion of said spring means, a fulcruming strut supported by said bracket and disposed between said medial portion of said spring means and said portion of said coupling means, flexible means disposed between said portion of said coupling means and said strut, said coupling means and said strut including generally complemental generally V-shaped portions and said flexible means being generally V-shaped and disposed therebetween, and means interconnecting said spring means and coupling means as a unit whereby said unit may fulcrum bodily as a beam about said strut as a fulcrum and against the effect of said flexible means to distribute between the axles heavy loads impressed vertically on one axle and whereby relatively light load axle movements are absorbed by said flexible means without beam action, said torque arms assuring true vertical movement of said axles at all times.

12. In a spring suspension of the kind described, a bracket adapted for attachment to the frame of a vehicle, an elongated spring means having parts thereof extending outwardly on opposite sides of said bracket enabling vehicle connections to be associated therewith, coupling means including a V-shaped portion spaced from said spring means, a V-shaped fulcruming strut supported by said bracket and disposed between said spring means and the V-shaped portion of said coupling means, a resilient pad disposed under compression between said portion of said coupling means and said strut, and means interconnecting said spring means and coupling means as a unit whereby said unit may fulcrum bodily as a beam about said strut as a fulcrum and against the effect of said resilient pad to distribute between the axles heavy loads impressed vertically on one axle and whereby relatively light load vertical axle movements are absorbed by said resilient pad without beam action.

13. A spring suspension according to claim 12 wherein said resilient pad is cored.

14. In a spring suspension of the kind described, a bracket adapted for attachment to the frame of a vehicle, elongated spring means having parts thereof extending outwardly on opposite sides of said bracket enabling vehicle front and rear axle connections to be associated therewith, coupling means including a V-shaped portion spaced from said spring means, a V-shaped fulcruming strut supported by said bracket and disposed between said spring means and said portion of said coupling means, a resilient pad disposed under compression between said portion of said coupling means and said strut, a rebound pad disposed between said spring means and said strut, and means interconnecting said spring means and coupling means as a unit whereby said unit may fulcrum bodily as a beam about said strut as a fulcrum and against the effect of said resilient pad to distribute between the axles heavy loads impressed vertically on one axle and whereby relatively light load vertical axle movements are absorbed by said resilient pad wtihout beam action.

15. A spring suspension according to claim 14 wherein said resilient pad is cored.

16. In a tandem spring suspension of the kind described, a bracket adapted for attachment to the frame of a vehicle, elongated spring means having parts thereof extending outwardly on opposite sides of said bracket, vehicle front and rear axles having sets of axle connections associated with said outer parts of said spring means and enabling vertical axle movements to be transmitted to said spring means, means associated with said axles providing vertically spaced attachments for ends of torque arms, means secured to the frame of the vehicle providing attachments for opposite ends of said torque arms, torque arms for each axle coupled to said attachments, torque arms associated with one such axle being canted to produce a caster effect, coupling means including a portion spaced from said spring means, a strut supported by said bracket and disposed between said spring means and said portion of said coupling means, flexible means disposed between said portion of said coupling means and said strut, and means interconnecting said spring means and coupling means for movement as a unit about said strut and against the effect of said flexible means.

17. In a tandem spring suspension of the kind described, a bracket adapted for atachment to the frame of a vehicle, elongated spring means having parts thereof extending outwardly on opposite sides of said bracket, vehicle front and rear axles having axle connections associated with said outer parts of said spring means and enabling vertical axle movements to be transmitted to said spring means, means associated with said axles providing vertically spaced attachments for ends of torque arms, means secured to the frame of the vehicle providing attachments for the opposite ends of said torque arms, torque arms coupled to said attachments, torque arms associated with one such axle being canted to produce a caster effect, coupling means including a V-shaped portion spaced from a medial portion of said spring means, a V-shaped fulcruming strut supported by said bracket in position between said medial portion of said spring means and said V-shaped portion of said coupling means, flexible means disposed between said portion of said coupling means and said strut, and means interconnecting said spring means and coupling means as a unit whereby said unit may fulcrum bodily as a beam about said strut as a fulcrum and against the effect of said flexible means to distribute between the axles heavy loads impressed vertically on one axle and whereby relatively light load vertical axle movements are absorbed by said flexible means without beam action.

18. In a tandem spring suspension of the kind described, a bracket adapted for attachment to the frame of a vehicle, elongated spring means having parts thereof extending outwardly on opposite sides of said bracket, vehicle front and rear axles having axle connections associated with said outer parts of said spring means and enabling vertical axle movements to be transmitted to said spring means, means associated with said axles providing vertically spaced attachments for ends of torque arms, means secured to said frame providing attachments for opposite ends of said torque arms, torque arms coupled to said attachments and arranged as a parallelogram for each axle of the vehicle, the torque arms associated with the rear axle connections being canted to produce a caster effect, coupling means including a portion spaced from said spring means, a strut supported by said bracket and disposed between said spring means and said portion of said coupling means, flexible means disposed between said portion of said coupling means and said strut, and means interconnecting said spring means and coupling means as a unit whereby said unit may move bodily as a unit relative to said strut and against the effect of said flexible means.

19. In a tandem spring suspension of the kind described, a bracket adapted for attachment to the frame of a vehicle, an elongated leaf spring having parts thereof extending outwardly an opposite sides of said bracket, vehicle front and rear axles having axle connections associated with said axle connections and including bearing plates arcuate transverse to the axis of said spring and on which are reposed tangently said outer parts of said spring enabling vertical axle movements to be transmitted to said spring, said axle connections including side plates limiting transverse shifting of said spring on said bearing plates, said side plates diverging outwardly in a direction away from the related bearing plate, means associated with said axles providing vertically spaced attachments for ends of torque arms, means secured to said frame providing attachments for opposite ends of said torque arms, torque arms coupled to said attachments and arranged as a parallelogram for each axle of the vehicle, the torque arms associated with the rear axle connections being canted to produce a caster effect, coupling means including a V-shaped portion spaced from the medial portion of said spring a V-shaped strut supported by said bracket and disposed between the medial portion of said spring and said V-shaped portion of said coupling means, a rubber pad disposed between said V-shaped portion of said coupling means and said strut, a rubber rebound pad disposed between said strut and the medial portion of said spring, and means interconnecting said spring means and coupling means as a unit whereby said unit may move bodily as a unit relative to said strut and against the effect of the first-named rubber pad.

20. In a spring suspension of the kind described, a bracket adapted for attachment to a vehicle, relatively elongated spring means having parts thereof extending outwardly on opposite sides of said bracket whereby vehicle axle connections may be associated with said spring means, coupling means attached to said spring means, a portion of said coupling means having oppositely angled divergent surfaces, a fulcruming strut supported by said bracket and spaced from said coupling means, said strut having oppositely angled fulcruming surfaces disposed opposite and in spaced relation to the angled surfaces of said coupling means, and flexible means having a predetermined spring rate and disposed between said coupling means and said strut, said flexible means being located on one side only of said coupling means.

21. In a spring suspension of the kind described, a bracket adapted for attachment to a vehicle, relatively elongated spring means having an intermediate part thereof disposed in said bracket whereby vehicle axle connections may be associated with said spring means outwardly of said intermediate part, coupling means secured to said spring means and including a portion having oppositely angled surfaces disposed opposite the intermediate part of said spring means, a strut supported by said bracket and spaced from said portion of said coupling means, said strut having oppositely angled surfaces substantially complemental to said surfaces of said coupling means, and flexible means confined under compression between said angled surfaces of said coupling means and said strut, whereby said spring means and flexible means independently support heavy and light loads, respectively, of the vehicle, and whereby said spring and coupling means may move as a unit bodily relative to said strut.

22. In a spring suspension of the kind described, a bracket attached in depending relation to a vehicle, elongated spring means having opposed parts thereof extending outwardly on opposite sides of said bracket with vehicle axle connections associated with the opposed parts of said spring means, said spring means remaining relatively rigid and unflexed up to predetermined loading of the vehicle, coupling means including a portion spaced from and secured to said spring means, a strut supported by said bracket and spaced from said portion of said coupling means, and additional spring means disposed between and having sides respectively in contact with said portion of said coupling means and said strut, said additional spring means being effective as a spring support for the vehicle up to said predetermined loading whereat the first-named spring means is effective.

23. In a spring suspension of the kind described, a bracket attached in depending relation to a vehicle, relatively elongated spring means having an intermediate part thereof disposed in said bracket whereby vehicle axle connections may be associated with said spring means outwardly of said intermediate part, coupling means including a portion opposite said intermediate part of said spring means, a strut supported by said bracket and spaced below said intermediate part of said spring means and above said portion of said coupling means, a pad of flexible material disposed between said portion of said coupling means and said strut and having sides in engagement with the opposed surfaces thereof, and means interconnecting said spring and coupling means and effective to retain said pad in compressive engagement with said strut and said portion of said coupling means, whereby said spring and flexible means independently support heavy and light loads on the vehicle, and whereby said spring and coupling means may move as a unit bodily relative to said strut.

24. In a spring suspension of the kind described, a bracket for attaching the suspension to a vehicle, relatively elongated spring means having parts thereof extended outwardly from opposite sides of said bracket, vehicle axle connections on said spring means whereby opposite free floating ends of said spring means may be respectively connected to spaced apart axles of the vehicle and thereby dispose said axles in a common horizontal plane, coupling means secured to said spring means and including a portion opposite the medial part of said spring means, a fulcruming strut of V-shape carried by said bracket, flexible means of V-shape for supporting the vehicle independently of said spring means and interposed between said strut and the portion of said coupling means, said bracket including a horizontal element through which the spring suspension may be connected to the frame of a vehicle with which the suspension is to be used, and the upper surface of said horizontal element being disposed in a plane spaced from that in which the axles are disposed, the degree of such spacing being such that the required relative movement between elements of the suspension and the frame may occur without such interengagement among the elements of the suspension and the frame that would impair proper functioning of the suspension in the course of movement with the vehicle in which the same is associated.

References Cited in the file of this patent

UNITED STATES PATENTS

| | | |
|---|---|---|
| 756,807 | Abraham | Apr. 12, 1904 |
| 1,575,118 | Lipcot | Mar. 2, 1926 |
| 1,797,858 | Froesch | Mar. 24, 1931 |
| 1,869,137 | Flintermann | July 26, 1932 |
| 2,078,521 | Alden | Apr. 27, 1937 |
| 2,096,530 | Alden | Oct. 19, 1937 |
| 2,745,677 | Walter | May 15, 1956 |
| 2,784,980 | Norrie | Mar. 12, 1957 |

UNITED STATES PATENT OFFICE
CERTIFICATION OF CORRECTION

Patent No. 2,951,709　　　　　　　　　　　　　September 6, 1960

James C. Ward

It is hereby certified that error appears in the above numbered patent requiring correction and that the said Letters Patent should read as corrected below.

In the grant, lines 2, 3, and 4, for "assignor, by mesne assignments, to Alaska Juneau Gold Mining Company, of Los Angeles, California, a corporation of West Virginia," read -- assignor, by mesne assignments, to A. J. Industries, Inc., a corporation of West Virginia, --; line 13, for "Alaska Juneau Gold Mining Company, its successors" read -- A. J. Industr: Inc., its successors --; in the heading to the printed specification, lines 3, 4, and 5, for "assignor, by mesne assignments, to Alaska Juneau Gold Mining Company, Los Angeles, Calif., a corporation of West Virginia" read -- assignor, by mesne assignments, to A. J. Industries, Inc., a corporation of West Virginia --.

Signed and sealed this 2nd day of May 1961.

(SEAL)
Attest:

ERNEST W. SWIDER　　　　　　　　　　　　　DAVID L. LADD
Attesting Officer　　　　　　　　　　　　　Commissioner of Patents